United States Patent [19]
Kaneko et al.

[11] Patent Number: 5,341,218
[45] Date of Patent: Aug. 23, 1994

[54] VIDEO SIGNALS CLAMPING CIRCUIT FOR MAINTAINING DC LEVEL OF VIDEO SIGNALS

[75] Inventors: Hideki Kaneko; Sadayuki Inoue; Ikuo Ookuma, all of Nagaokakyo, Japan

[73] Assignee: Mitsubishi Denki Kabushiki Kaisha, Tokyo, Japan

[21] Appl. No.: 864,679

[22] Filed: Apr. 7, 1992

[30] Foreign Application Priority Data

Apr. 9, 1991 [JP] Japan ................. 3-075466

[51] Int. Cl.$^5$ .............. H04N 5/18; H04N 5/16; H04N 9/72
[52] U.S. Cl. ................. 348/695; 348/691
[58] Field of Search ............ 358/171, 172, 34

[56] References Cited

U.S. PATENT DOCUMENTS

| 4,473,864 | 9/1984 | Mackereth | 358/172 |
|---|---|---|---|
| 4,562,471 | 12/1985 | Eouzan et al. | 358/172 |
| 4,691,235 | 9/1987 | Okui | 358/172 |
| 4,742,392 | 5/1988 | Hashimoto | 358/172 |
| 4,970,594 | 11/1990 | Kitaura et al. | 358/172 |
| 5,057,920 | 10/1991 | Wilkinson | 358/172 |

FOREIGN PATENT DOCUMENTS

| 3744076 | 7/1989 | Fed. Rep. of Germany . |
|---|---|---|
| 3817421 | 2/1990 | Fed. Rep. of Germany . |
| 4005798 | 8/1990 | Fed. Rep. of Germany . |
| 58-124373 | 7/1983 | Japan . |
| 60-16769 | 1/1985 | Japan ........ 358/172 |
| 61-161080 | 7/1986 | Japan . |
| 63-176070 | 7/1988 | Japan . |
| 335666 | 2/1991 | Japan . |
| 2212692 | 7/1989 | United Kingdom . |

OTHER PUBLICATIONS

Item 1(a) Japanese Printed Publication 3-35,666 A. In: Patents Abstr. of Japan, Sect. E., vol. 15 (1991), No. 165 (E-1061).

Primary Examiner—John K. Peng

[57] ABSTRACT

A video signal clamping circuit capable of maintaining a DC level of a digital video signal at a fixed level, in which a pedestal level in a vertical blanking period of the digital video signal after an A/D conversion is sampled, and an average value of a plurality of sampling data in a plurality of fields is calculated by an average value calculator. The average value is compared with a predetermined clamp level reference value by a comparison output circuit, and depending on the comparison result, a signal either added or subtracted by a certain width to or from an output signal of a predetermined period before is output for automatically controlling a clamp voltage.

11 Claims, 12 Drawing Sheets

| (a) OUTPUT OF ACCUM101 | (b) j=k=1 (OFFSET = 8) OUTPUT OF ADD 103 | (c) j=0, k=1 (OFFSET = 4) OUTPUT OF ADD 103 | (d) j=k=0 (OFFSET = 2) OUTPUT OF ADD 103 |
|---|---|---|---|
| 10000001 0000 | 10000001 1000 | 10000001 0100 | 10000001 0010 |
| 10000000 1111 | 10000001 0111 | 10000001 0011 | 10000001 0001 |
| 10000000 1110 | 10000001 0110 | 10000001 0010 | 10000001 0000 |
| 10000000 1101 | 10000001 0101 | 10000001 0001 | 10000000 1111 |
| 10000000 1100 | 10000001 0100 | 10000001 0000 | 10000000 1110 |
| 10000000 1011 | 10000001 0011 | 10000000 1111 | 10000000 1101 |
| 10000000 1010 | 10000001 0010 | 10000000 1110 | 10000000 1100 |
| 10000000 1001 | 10000001 0001 | 10000000 1101 | 10000000 1011 |
| 10000000 1000 | 10000001 0000 | 10000000 1100 | 10000000 1010 |
| 10000000 0111 | 10000000 1111 | 10000000 1011 | 10000000 1001 |
| 10000000 0110 | 10000000 1110 | 10000000 1010 | 10000000 1000 |
| 10000000 0101 | 10000000 1101 | 10000000 1001 | 10000000 0111 |
| 10000000 0100 | 10000000 1100 | 10000000 1000 | 10000000 0110 |
| 10000000 0011 | 10000000 1011 | 10000000 0111 | 10000000 0101 |
| 10000000 0010 | 10000000 1010 | 10000000 0110 | 10000000 0100 |
| 10000000 0001 | 10000000 1001 | 10000000 0101 | 10000000 0011 |
| 10000000 0000 | 10000000 1000 | 10000000 0100 | 10000000 0010 |
| 01111111 1111 | 10000000 0111 | 10000000 0011 | 10000000 0001 |
| 01111111 1110 | 10000000 0110 | 10000000 0010 | 10000000 0000 |
| 01111111 1101 | 10000000 0101 | 10000000 0001 | 01111111 1111 |
| 01111111 1100 | 10000000 0100 | 10000000 0000 | 01111111 1110 |
| 01111111 1011 | 10000000 0011 | 01111111 1111 | 01111111 1101 |
| 01111111 1010 | 10000000 0010 | 01111111 1110 | 01111111 1100 |
| 01111111 1001 | 10000000 0001 | 01111111 1101 | 01111111 1011 |
| 01111111 1000 | 10000000 0000 | 01111111 1100 | 01111111 1010 |
| 01111111 0111 | 01111111 1111 | 01111111 1011 | 01111111 1001 |
| 01111111 0110 | 01111111 1110 | 01111111 1010 | 01111111 1000 |
| 01111111 0101 | 01111111 1101 | 01111111 1001 | 01111111 0111 |
| 01111111 0100 | 01111111 1100 | 01111111 1000 | 01111111 0110 |
| 01111111 0011 | 01111111 1011 | 01111111 0111 | 01111111 0101 |
| 01111111 0010 | 01111111 1010 | 01111111 0110 | 01111111 0100 |
| 01111111 0001 | 01111111 1001 | 01111111 0101 | 01111111 0011 |
| 01111111 0000 | 01111111 1000 | 01111111 0100 | 01111111 0010 |
| 01111110 1111 | 01111111 0111 | 01111111 0011 | 01111111 0001 |

↑ COMPARE INT PART ONLY (SIGNIF 8BITS) WITH REF VALUE

↑ COMPARE INT PART+DOWN TO 1ST DECI (SIGNIF 9BITS) WITH REF VALUE

↑ COMPARE INT PART+DOWN TO 2ND DECI (SIGNIF 10BITS) WITH REF VALUE

Fig. 12

VIDEO SIGNALS CLAMPING CIRCUIT FOR MAINTAINING DC LEVEL OF VIDEO SIGNALS

BACKGROUND OF THE INVENTION i) Field of the Invention

The present invention relates to a video signal clamping circuit capable of always maintaining the DC level of digital data of digital video signals at a predetermined level after an analog-digital conversion.

ii) Description of the Related Arts

In FIG. 1, there is shown a conventional video signal clamping circuit. In this case, an input terminal IN is coupled to a buffer amplifier 1 and a clamp pulse generator circuit 7 for supplying a clamp pulse to a sample hold circuit 6. The buffer amplifier 1 is connected via a capacitor 2 to an A/D (analog-digital) converter 8 for converting a clamped analog video signal into a digital video signal b. A pair of resistor elements 3 and 4 for determining a clamp voltage are connected to a clamp voltage generator circuit 5 as a buffer means. The sample and hold circuit 6 is connected to the clamp voltage generator circuit 5 and the A/D converter 8 which in turn is coupled to an output terminal OUT.

Next, the operation of this conventional video signal clamping circuit will now be described.

As shown in FIG. 1, the analog video signal a is fed to the buffer amplifier 1 via the input terminal IN and is amplified. A DC component of an amplified analog video signal is removed by the capacitor 2. The clamp voltage determined by the resistor elements 3 and 4 is input from the clamp voltage generator circuit 5 to the sample and hold circuit 6.

On the other hand, the clamp pulse generator circuit 7 separates a horizontal synchronous signal component from the input analog video signal a and generates a clamp pulse having a proper width and timing. The generated clamp pulse is sent from the clamp pulse generator circuit 7 to the sample and hold circuit 6. The sample and hold circuit 6 holds the output of the clamp voltage generator circuit 5 at the timing of the clamp pulse output from the clamp pulse generator circuit 7. The analog video signal through the capacitor 2 is clamped at the clamp voltage output from the sample and hold circuit 6 and the clamped analog video signal is converted into the digital video signal b in the A/D converter 8. The digital video signal b is output from the output terminal OUT. A conventional video signal clamping circuit of this kind is disclosed in Japanese Patent Laid-Open No. Sho 63-176070 or the like.

Recently, with the rapid development of digital signal processing techniques, within the video signal processing field, the time base compression and extension, and even the delay and the like of the video signal are processed by using digital signals, and thus the clamping technique of the video signal to be input to the A/D converter becomes important.

For example, in a VTR (video tape recorder) or VCR (video cassette recorder), after an analog video signal is converted into a digital video signal in an A/D converter and a time base extension of a luminance signal with a wide band and a time base compression of a chrominance signal with a narrow band are carried out, a synchronizing signal is inserted to perform recording. In this case, when a DC level of the digital video signal after the A/D conversion is different from a predetermined value or is changed, an error is caused against the synchronous signal inserted in the predetermined level, or the like.

However, in the conventional video signal clamping circuit, by a change of the clamp voltage due to the variance of characteristics of circuit elements or a change of the power source voltage, the DC level of the video signal can often be shifted off a reference value. In such a case, adjustment is required every time. Further, even when the DC level of the analog video signal to be input to the A/D converter is adjusted, since the A/D converter itself contains a DC drift, the DC level of the digital signal after the A/D conversion is not always converted into the predetermined digital value.

SUMMARY OF THE INVENTION

It is therefore an object of the present invention to provide a video signal clamping circuit in view of the defects of the prior art, which is capable of always controlling the DC level of a digital video signal after a A/D conversion to be a proper value without carrying out an adjustment of the DC level regardless of variance of characteristics of circuit elements and a change of the power source voltage, and automatically supplying a stable and highly accuracy clamp voltage even when a S/N ratio of the video signal is bad.

In accordance with one aspect of the present invention, there is provided a video signal clamping circuit for keeping the DC level of a digital video signal to a fixed level, comprising an A/D converter for converting an input analog video signal into the digital video signal; a first latch circuit for sampling a predetermined part of the digital video signal at a predetermined period and latching sampled data; an average value calculator circuit for taking in a predetermined number of the sampled data latched by the first latch circuit and calculating an average value of the sampled data; a comparison output circuit for comparing the average value obtained in the average value calculator circuit with a reference value and outputting data either added or subtracted by a predetermined width to or from an output signal of a predetermined period before depending on a comparison result; a D/A converter for converting the data output by the comparison output circuit into an analog signal; and a clamp voltage supply means for supplying a clamp voltage to the analog video signal on the basis of the analog signal output by the D/A converter.

In this case, an average value of a plurality of sampled data of the digital video signal after the A/D conversion is compared with a reference value, and depending on the comparison result, a signal either added or subtracted by a predetermined width to or from an output signal of a predetermined period before is output to control the clamp voltage. Hence, even when a S/N ratio of the video signal is bad, a stable and highly accuracy clamp voltage can be automatically supplied.

Further, the number of the data taken in the average value calculator circuit is changed depending on the variation width of the digital video signal to enable the clamp voltage to control with certain accuracy corresponding to the video signal conditions.

Further, an effective digit number of the average value is changed depending on the variation width of the digital video signal to enable the carrying out of a suitable clamp voltage control.

The clamp voltage supply means can include a level compression shift circuit for carrying out a level compression so that the amount of voltage variation in the output of the D/A converter corresponding to 1 LSB of change of the input of the D/A converter is less than the voltage variation amount of 1 LSB change in the output of the A/D converter, and also for carring out a shifting of a voltage level to a predetermined level.

Further, the clamp voltage supply means can include a buffer means for stabilizing the output of the level compression shift circuit, and a hold means for holding an output of the buffer means at a predetermined point in time and supplying the clamp voltage to the analog video signal input to the A/D converter.

The present circuit can also comprise a second latch circuit for latching the output of the comparison output circuit at a predetermined point in time and supplying the output to the D/A converter.

The present circuit can also comprise first control signal generator means for generating a first control signal for determining a sampling timing of the first latch circuit and a take-in timing of the average value calculator circuit, on the basis of a vertical synchronizing signal of the analog video signal, to supply data in a pedestal period of the analog video signal to the average value calculator circuit.

The present circuit can also comprise second control signal generator means for generating a second control signal for determining a number of data items taken from the first latch circuit into the average value calculator circuit.

The present circuit can also comprise variation width detector means for detecting a variation width of the output of the first latch circuit to change the number of data items taken into the average value calculator circuit according to the variation width. The variation width detector means can include first and second comparators for comparing the variation width with first and second reference values, respectively, to detect the variation width from the comparison results of the two comparators.

The present circuit can also comprise variation width detector means for detecting a variation width of the output of the first latch circuit and mask processor means for masking predetermined decimal bits of data of the output of the average value calculator circuit to change the number of bits masked by the mask processor means depending on the detection result of the variation width detector means.

The average value calculator circuit can include an accumulator for accumulating a predetermined number of the sampled data, an adder for adding a predetermined offset value to an output of the accumulator, and an offset value generator for generating the predetermined offset value.

BRIEF DESCRIPTION OF THE DRAWINGS

The above and other objects, features and advantages of the present invention will more fully appear from the following description of the preferred embodiments with reference to the accompanying drawings, in which:

FIG. 12 is an explanatory diagram showing output data of an accumulator 101 and an adder 103 in the average value calculation circuit shown in FIG. 11.

DESCRIPTION OF THE PREFERRED EMBODIMENTS

Figure 1:
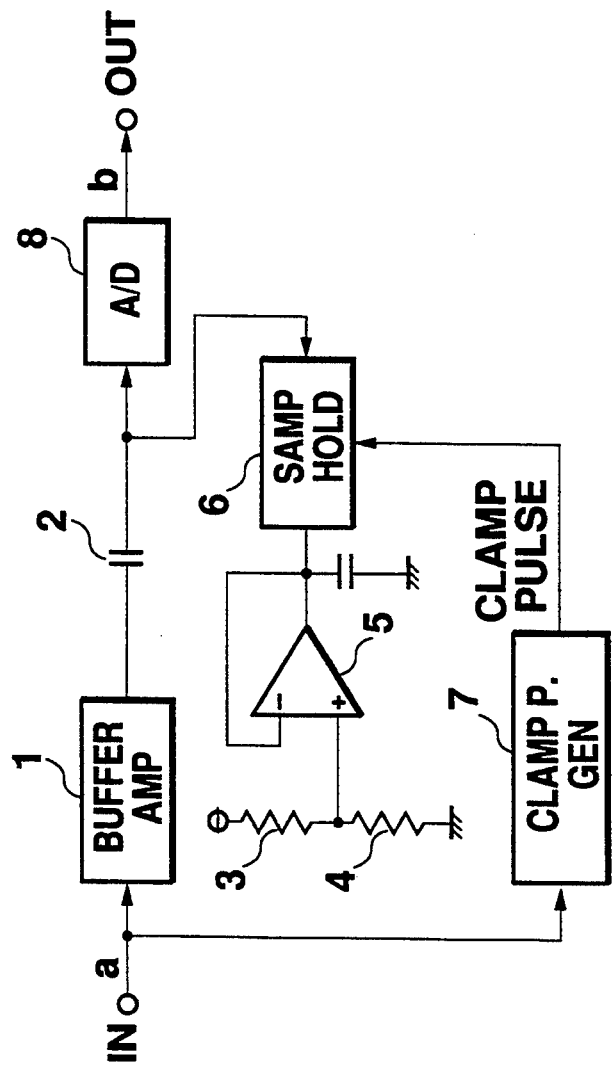
FIG. 1 is a block diagram of a conventional video signal clamping circuit.

The present invention will now be described in connection with its preferred embodiments with reference to the attached drawings, wherein like reference characters designate like or corresponding parts throughout the views and thus the repeated description thereof can be omitted for brevity.

Figure 2:
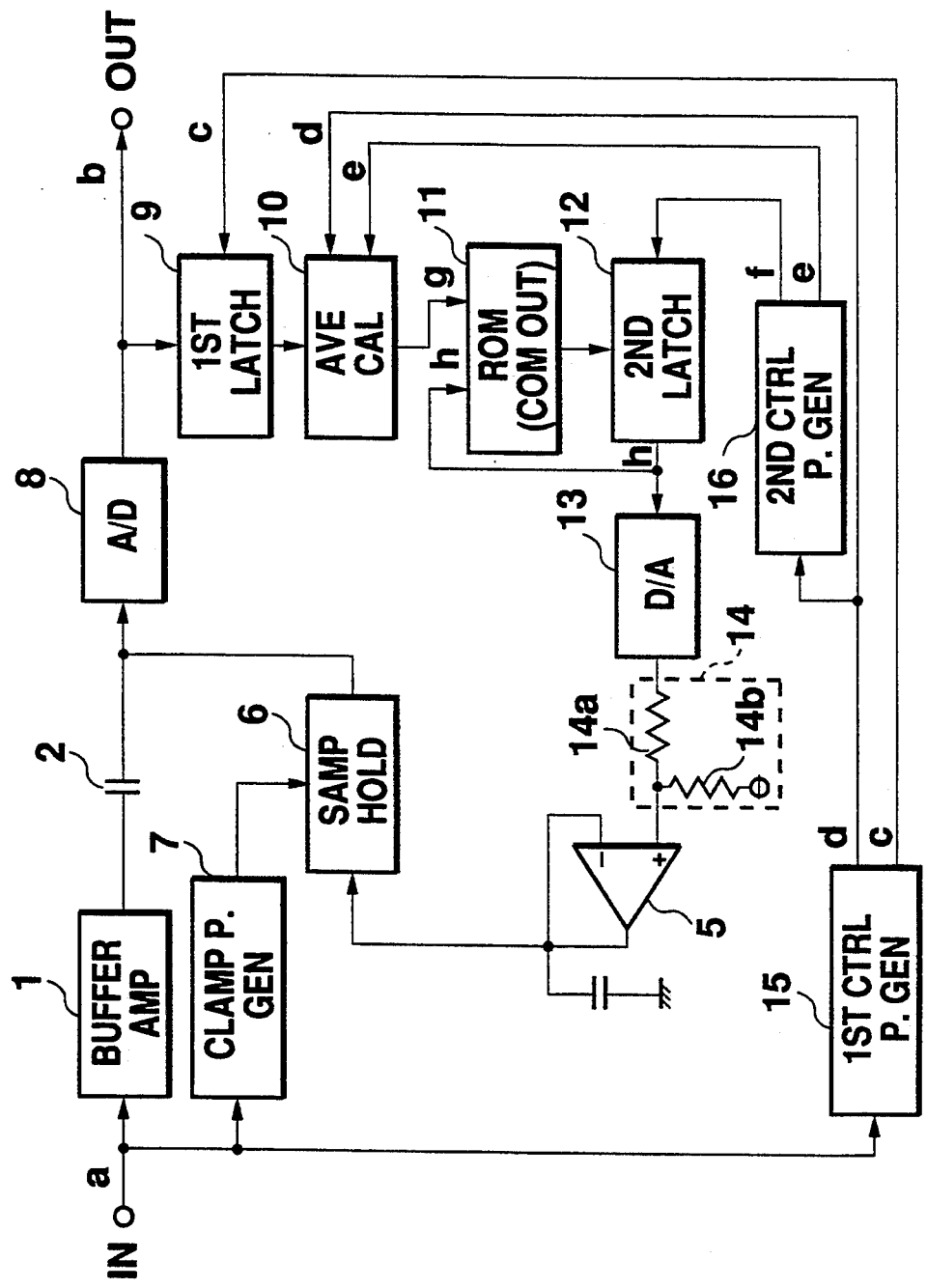
FIG. 2 is a block diagram of a first embodiment of a video signal clamping circuit according to the present invention.

In FIG. 2, there is shown the first embodiment of a video signal clamping circuit according to the present invention. In this embodiment, a buffer amplifier 1, a capacitor 2, a clamp voltage generator circuit 5, a sample and hold circuit 6, a clamp pulse generator circuit 7 and an A/D converter 8 have the same constructions and functions as those of the conventional video signal clamping circuit shown in FIG. 1. A first latch circuit 9 carries out a sampling of a predetermined part of a digital video signal b output from the A/D converter 8 at a predetermined point in time. An average value calculator circuit 10 takes in sampling signals output from the first latch circuit 9 at a certain point in time, calculates an average value g of a certain number of sampled data, and outputs the calculated average value g at the end of each average value calculation.

A ROM 11 constituting a comparison output circuit 11 compares the output g of the average value calculator circuit 10 with a reference value and outputs a signal added or subtracted by a predetermined width to or from the output signal of the previous point in time, depending on the difference obtained by the comparison in the ROM 11. The second latch circuit 12 latches the output of the ROM 11 every sampling period. A D/A (digital-analog) converter 13 converts the output h of the second latch circuit 12 into an analog value, and a level compression shift circuit 14, which is composed of a pair of resistor elements 14a and 14b, carries out a level compression and a shifting of the output of the D/A converter 13. The output of the level compression shift circuit 14 is fed to the clamp voltage generator circuit 5.

On the basis of a vertical synchronizing signal of the input analog video signal a, a first control pulse generator circuit 15 outputs a latch pulse c to the first latch circuit 9 at the proper timing during a pedestal period and a data in control pulse d to the average value calculator circuit 10 at the proper timing for taking in the sampling signal in the average value calculator circuit 10. On the basis of the data in control pulse d output from the first control pulse generator circuit 15, a second control pulse generator circuit 16 outputs a start control pulse e to the average value calculator circuit 10 at the proper timing for starting the average value calculation at the certain point in time and a latch pulse f to the second latch circuit 12 at the proper timing.

Next, the operation of the video signal clamping circuit described above in connection with FIG. 2 will now be described in detail.

As shown in FIG. 2, the analog video signal a is input to the buffer amplifier 1 via the input terminal IN and is amplified therein. Then, the DC component of the amplified analog video signal is removed by the capacitor 2, and the DC component of the analog video signal is clamped to a predetermined value at the clamp voltage output from the sample and hold circuit 6. The clamped analog video signal is converted into the digital video signal b in the A/D converter 8.

Figure 3:
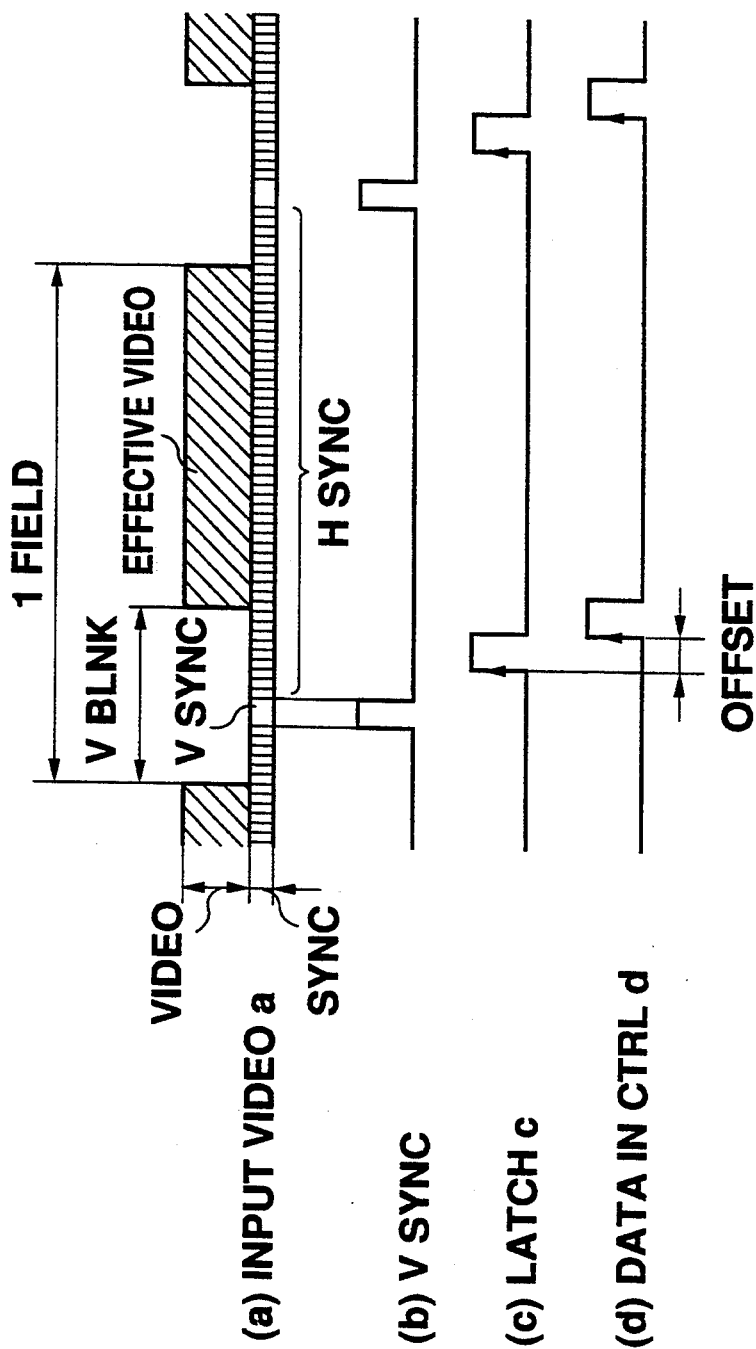
FIG. 3 is a timing chart showing a latch pulse c and a data in control pulse d shown in FIG. 2.

On the other hand, the input analog video signal a is input to the first control pulse generator circuit 15, and the first control pulse generator circuit 15 outputs the latch pulse c and the data in control pulse d at the timings shown in FIG. 3. That is, in the first control pulse generator circuit 15, a vertical synchronous signal shown in FIG. 3 (b) is separated from the input video signal as shown in FIG. 3 (a), and based on the vertical synchronizing signal, the first control pulse generator circuit 15 outputs the latch pulse c having one field (1/60 second) period, generated at the proper timing for sampling the pedestal part of the output digital video signal b as shown in FIG. 3 (c) and the data in control pulse d having a certain period of offset with reference to the latch pulse c as shown in FIG. 3 (d).

Figure 4:
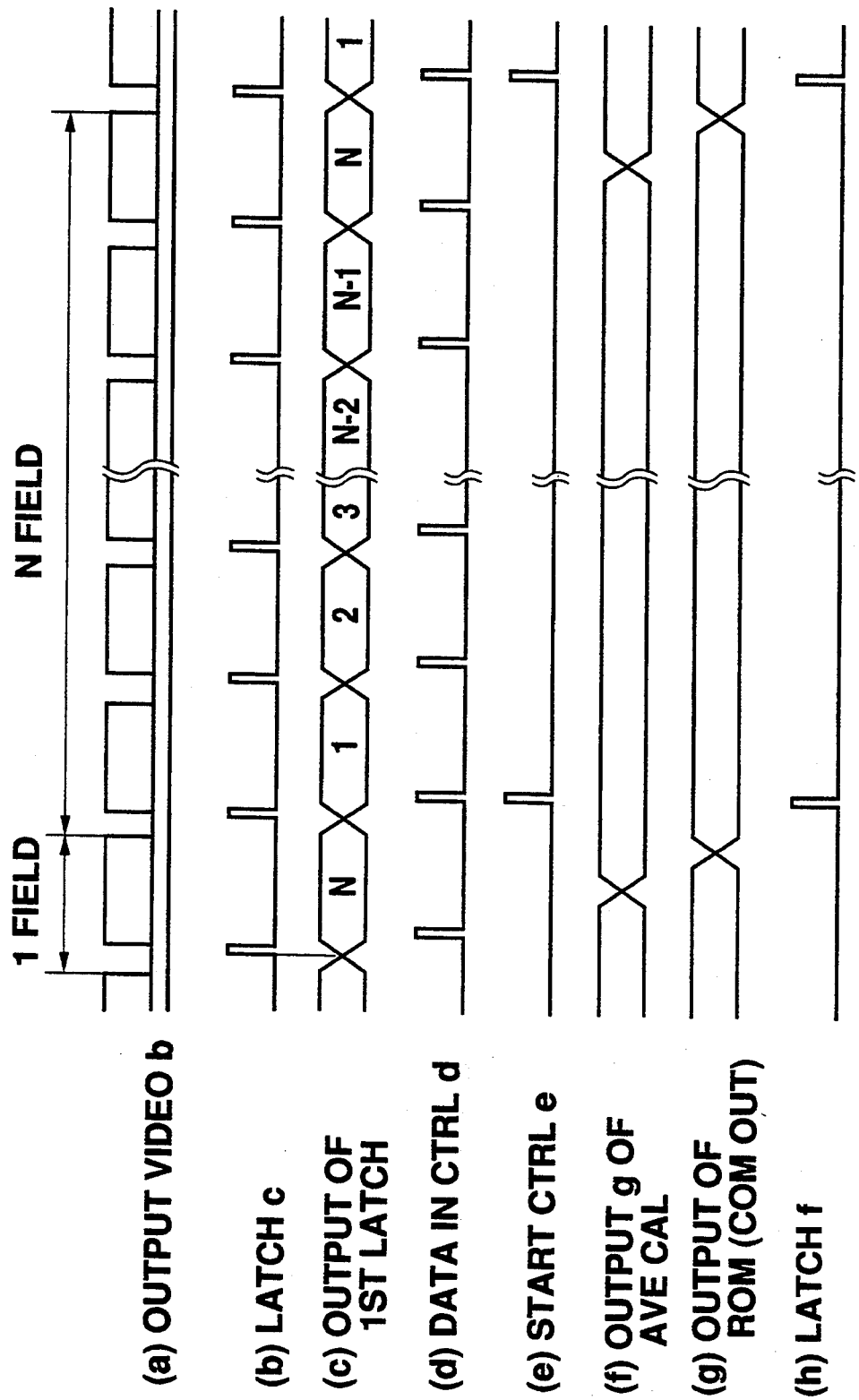
FIG. 4 is a timing chart illustrating a calculation process for obtaining an average value in the circuit shown in FIG. 2.

FIG. 4 shows a variety of pulses and signals shown in FIG. 2. The pedestal part of the digital video signal b (FIG. 4 (a)) is latched by the first latch circuit 9 at the timing of the latch pulse c (FIG. 4 (b)) and the output (FIG. 4 (c)) of the first latch circuit 9 is taken into the average value calculator circuit 10 at the timing of the data in control pulse d (FIG. 4 (d)).

In turn, the data in control pulse d is also fed to the second control pulse generator circuit 16, and the second control pulse generator circuit 16 counts the data in control pulses d and outputs the start control pulse e and the latch pulse f to the average value calculator circuit 10 and the second latch circuit 12, respectively, at the predetermined timing such as each period of N fields as shown in FIG. 4 (e) and FIG. 4 (h).

On the basis of the start control pulse e, the average value calculator circuit 10 takes in the sampling data of the pedestal part in a plurality of fields such as the N fields in the case of FIG. 4 at the timing of the data in control pulse d and executes the average value calculation processing of the N number of sampling data items to output the average value g (FIG. 4 (f)). The average value calculator circuit 10 can be readily realized by using a microcomputer or the like.

The calculation result g of the average value calculator circuit 10 is used as an address signal of the ROM 11. In turn, the output (FIG. 4 (g)) of the ROM 11 is input to the second latch circuit 12 and is latched by the latch pulse f therein. The output h of the second latch circuit 12 is input to not only the D/A converter 13 but also the ROM 11.

Hence, the ROM 11 outputs the value stored in the address specified by the two values of the signals g and h. In the ROM 11, when the value of the signal g is smaller than a reference pedestal value, a value 1 LSB larger than the value of the signal h is stored. When the value of the signal g is equal to the reference pedestal value, an equal value to the value of the signal h is stored, and when the value of the signal g is larger than the reference pedestal value, a value 1 LSB smaller than the value of the signal h is stored.

Accordingly, the ROM 11 compares the output g of the average value calculator circuit 10, i.e., the average value of the N number of sampling data items in the past N fields, including the present value, with the reference pedestal value. When the output g of the average value calculator circuit 10 is smaller than the reference pedestal value, the ROM 11 outputs a value 1 LSB larger than the output h of the second latch circuit 12, i.e., the output value of the N fields before. When the output g of the average value calculator circuit 10 is larger than the reference pedestal value, the ROM 11 outputs a value 1 LSB smaller than the output h of the second latch circuit 12 in the same manner as described above.

Then, the level compression of the output of the D/A converter 13 is performed by the level compression shift circuit 14 so that the conversion width per one bit may be smaller than the resolution per one bit of the A/D converter 8, and simultaneously the level shift of the same is carried out so that the signal may swing around the converging value. The output of the level compression shift circuit 14 is supplied to the clamp voltage generator circuit 5, and the clamp voltage generator circuit 5 changes the output voltage depending on the input voltage. The output voltage of the clamp voltage generator circuit 5 is fed as the clamp voltage to the A/D converter 8 through the sample and hold circuit 6.

Figure 5:
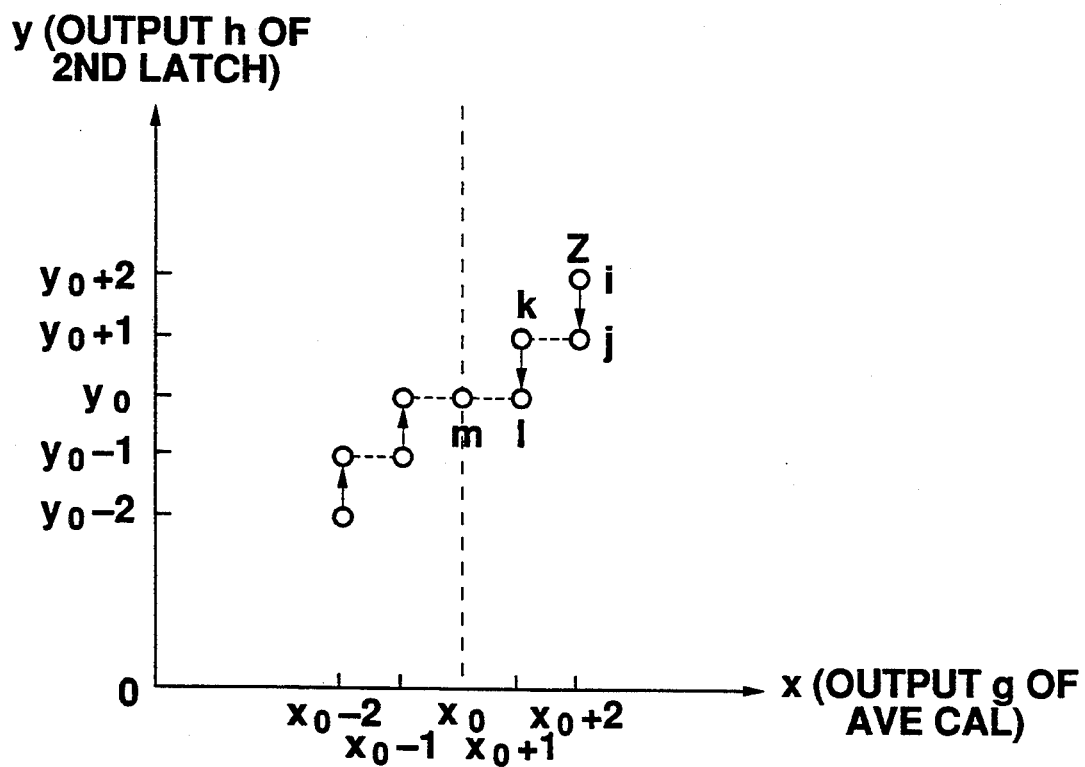
FIG. 5 is a graphical representation showing a converging operation of a clamp value in the circuit shown in FIG. 2.

FIG. 5 illustrates this converging operation of the clamp value by the ROM, in which the output g of the average value calculator circuit 10, the output h of the second latch circuit 12, the output of the ROM 11 and the reference pedestal value are defined as x, y, z and x0, respectively, and the value y when x=x0 is y0.

For example, when z is positioned in i (y0+2, x0+2), since z>x0, 1 smaller value z=y0+1 (position j) is output after the N fields. Next, when x is changed from x0+2 (position j) to x0+1 (position k), since x is still larger than x0, still 1 smaller value z=y0 (position l) then the value of the previous time, that is, the N fields before is output. As described above, at last the values x and y converge to x0 and y0, respectively (position m).

In this embodiment, although the latch pulse c is the pulse of one field period, another pulse of another period can be used. Although the comparison output circuit 11 is made by the ROM, however, it can be made by another gate, and quite the same effect can be obtained by using a microcomputer or the like. Although the level compression shift circuit 14 is composed of resistor elements, it can be composed of a combination of other active elements or the like.

Figure 6:
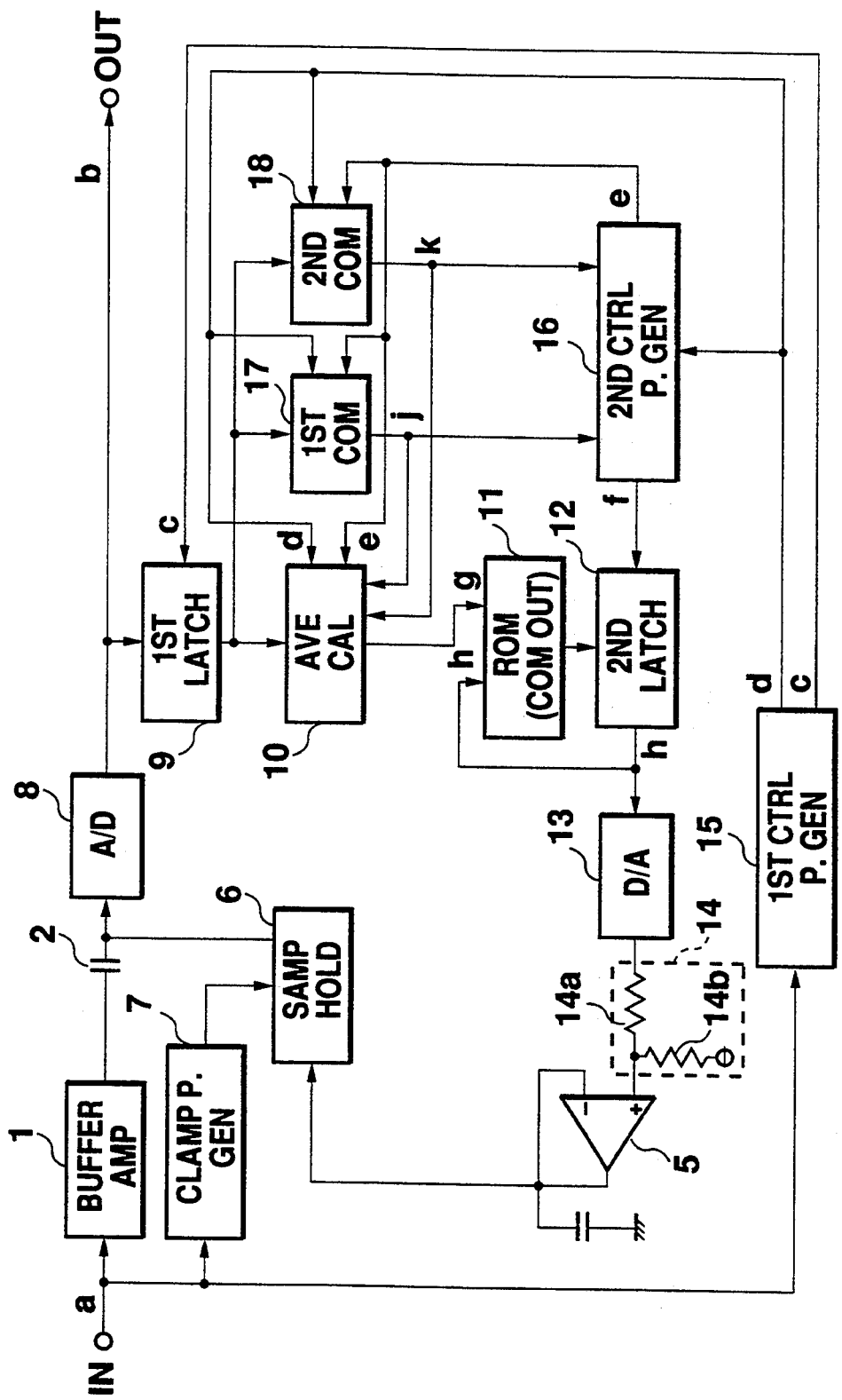
FIG. 6 is a block diagram of a second embodiment of a video signal clamping circuit according to the present invention.

In FIG. 6, there is shown the second embodiment of the video signal clamping circuit according to the present invention, having the same construction as the first embodiment shown in FIG. 2, except first and second comparator circuits 17, 18 are further included.

In this embodiment, the first comparator circuit 17 takes in the sampling signal output from the first latch circuit 9 at a predetermined time and compares a plurality of sampling data items within a period determined by an external signal with a reference value $\pm\alpha$ to output a control signal j, and the second comparator circuit 18 takes in the sampling signal output from the first latch circuit 9 at a predetermined time and compares a plurality of sampling data items within a period determined by an external signal with a reference value $\pm\beta$ (but $\alpha > \beta$) to output a control signal k, as hereinafter described in detail.

In this case, on the basis of the data in control pulse d output from the first control pulse generator circuit 15, at the timing determined by the control signals j and k output from the first and second comparator circuits 17 and 18, the second control pulse generator circuit 16 outputs the start control pulse e at a suitable timing for the start controls of the average value calculation of the average value calculator circuit 10 and the first and second comparator circuits 17 and 18 and the latch pulse f at a suitable timing for the second latch circuit 12.

Next, the operation of the video signal clamping circuit described above in connection with FIG. 6 will be described in detail with reference to FIGS. 7, 8 and 9, but the same portions as those described above in the first embodiment can be omitted for brevity.

Figure 7:
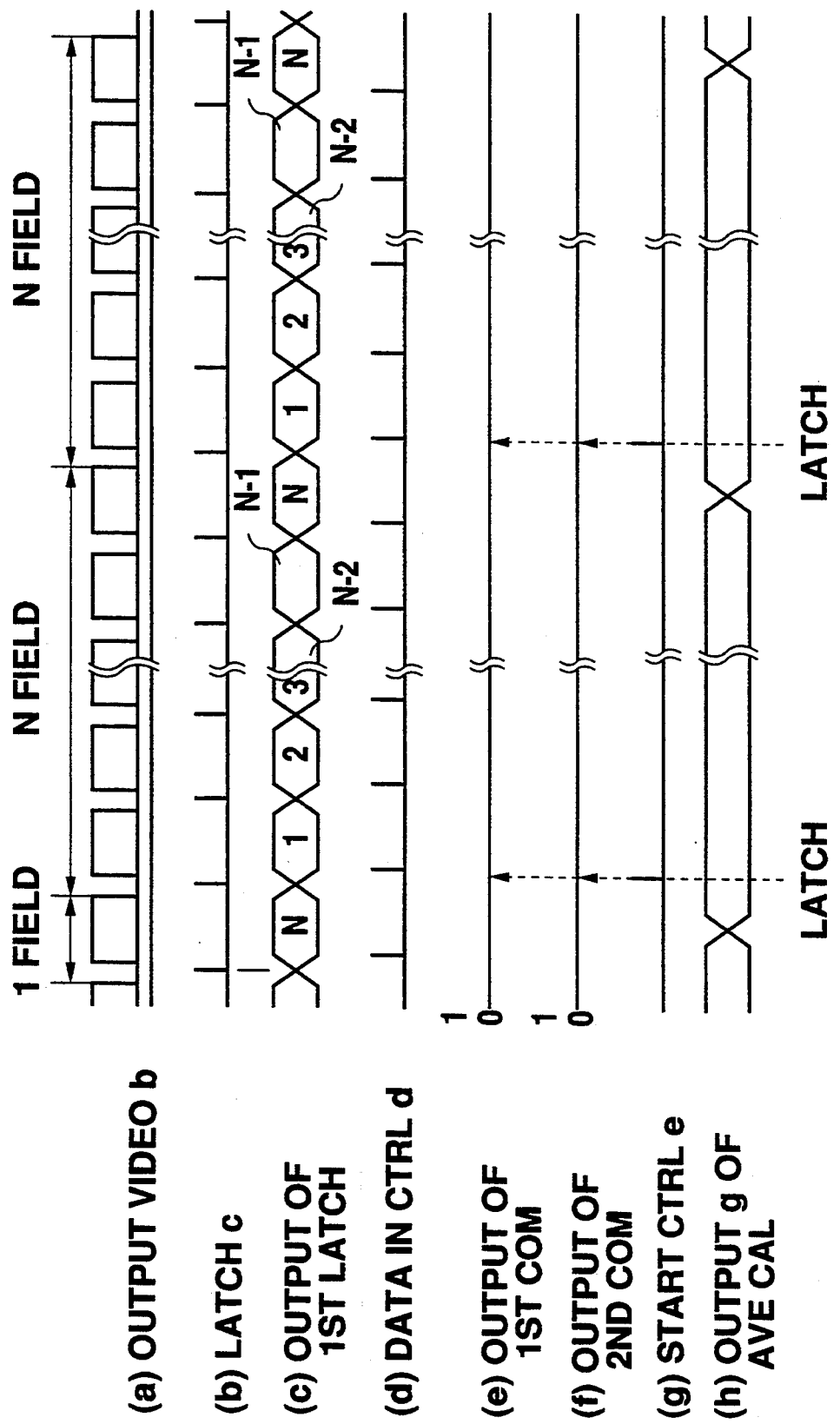
FIG. 7 is a timing chart illustrating a moving process to a calculation for obtaining an average value of data between N fields in the circuit shown in FIG. 6.

The pedestal part of the digital video signal b (FIG. 7 (a)) is latched by the first latch circuit 9 at the timing of the latch pulse c (FIG. 7 (b)), and the output (FIG. 7 (c)) of the first latch circuit 9 is taken into the average value calculator circuit 10 and the first and second comparator circuits 17 and 18 at the timing of the data in control pulse d (FIG. 7 (d)).

On the basis of the start control pulse e (FIG. 7 (g)) output from the second control pulse generator circuit 16, the average value calculator circuit 10 takes in the sampling data of the pedestal part in the fields of predetermined numbers such as the N numbers which are determined by the output control signals j and k (FIG. 7 (e) and FIG. 7 (f)) of the first and second comparator circuits 17 and 18, at the timing of the data in control pulse d (FIG. 7 (d)) and performs the average value calculation of the N number of the sampling data items to output the average value g (FIG. 7 (h)) after completing the average value calculation.

The calculation result g of the average value calculator circuit 10 is used as the address signal of the ROM 11 in the same manner as the first embodiment shown in FIG. 2.

On the other hand, the first and second comparator circuits 17 and 18 start to carry out the comparison operations on the basis of the start control pulse e output from the second control pulse generator circuit 16.

That is, the first comparator circuit 17 compares the output of the first latch circuit 9 with the reference value $\pm\alpha$ through the N fields. For example, when the output values of the first latch circuit 9 are all present in the N number of data items between the reference value $+\alpha$ and the reference value $-\alpha$, the control signal j (FIG. 7 (e)) to be fed to the average value calculator circuit 10 and the second control pulse generator circuit 16 is not changed as it is "0". In turn, when at least one of the output values of the first latch circuit 9 is not present in the data between the reference value $+\alpha$ and the reference value $-\alpha$, the control signal j is changed to "1".

Similarly, the second comparator circuit 18 compares the output of the first latch circuit 9 with the reference value $\pm\beta$ (but $\alpha > \beta$) through the N fields. For example, when the output values of the first latch circuit 9 are all present in the N number of data items between the reference value $+\beta$ and the reference value $-\beta$, the control signal k (FIG. 7 (f)) to be fed to the average value calculator circuit 10 and the second control pulse generator circuit 16 is not changed as it is "0". In turn, when at least one of the output values of the first latch circuit 9 is not present in the data between the reference value $+\beta$ and the reference value $-\beta$, the control signal k is changed to "1".

Further, in the subsequent processing, by the control signals j and k output from the first and second comparator circuits 17 and 18, the number of sampling data items to be used for the average value calculation in the average value calculator circuit 10 and the number of sampling data items to be used for the comparison operations in the first and second comparator circuits 17 and 18 are controlled.

In the embodiments shown in FIGS. 4 and 7, when the control signals of the first and second comparator circuits 17 and 18 as shown in FIG. 7 (e) and (f) are not output, that is, the error difference between the N number of sampling data items in the N fields and the reference value is at most $|\beta|$, the second control pulse generator circuit 16 outputs the start control pulse e and the latch pulse f so that the number of sampling data items used for the average value calculation and the comparison operations in the subsequent processing may be the N number of data items in the N fields.

Figure 8:
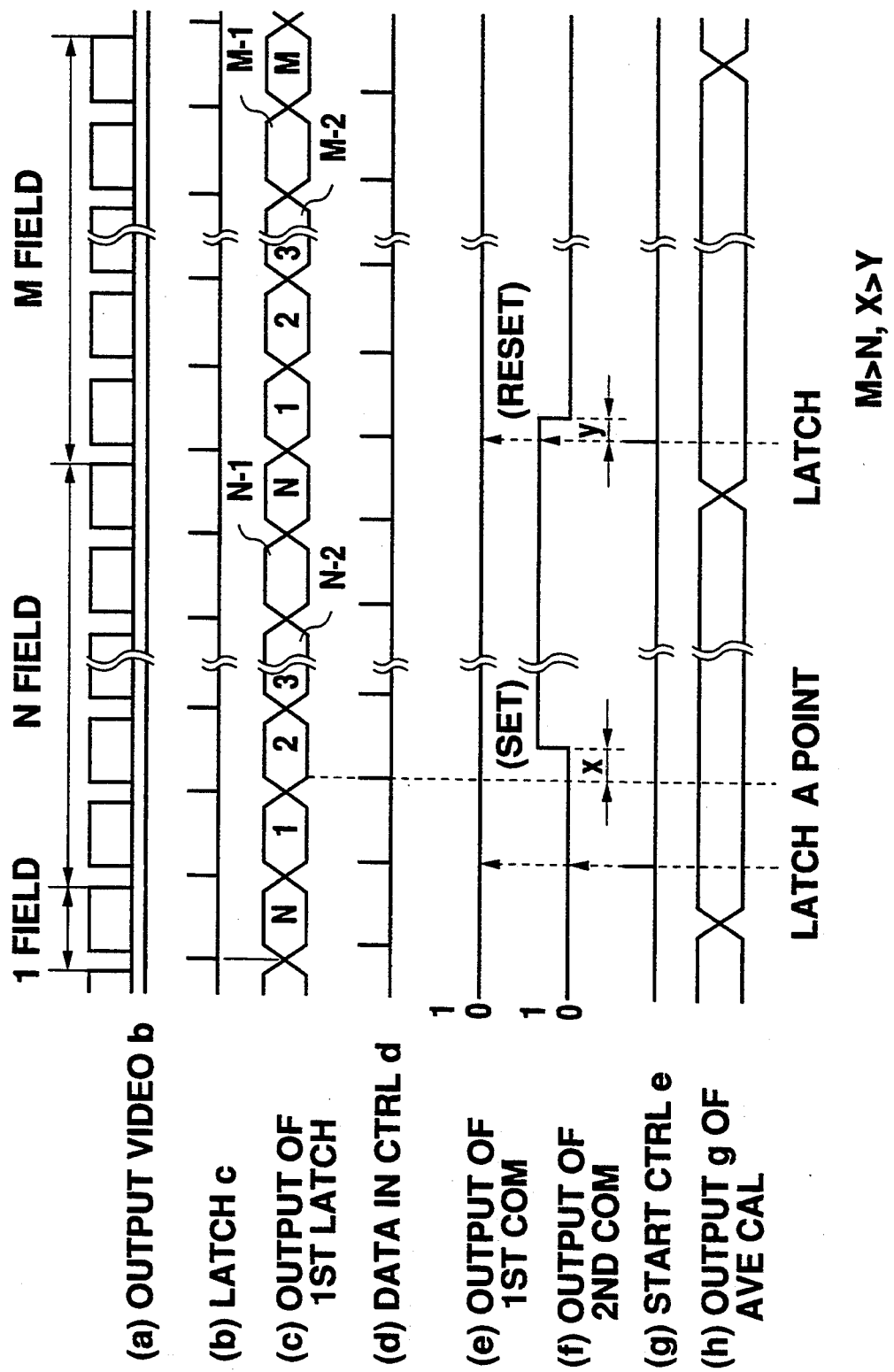
FIG. 8 is a timing chart illustrating a moving process to a calculation for obtaining an average value of data between N fields and M fields in the circuit shown in FIG. 6.

In another example shown in FIG. 8, during the process that carries out the comparison operation between the N number of sampling data items in the N fields and the reference value, by using the first and second comparator circuits 17 and 18, the second sampling value is taken in at the timing of a point A and is compared with the reference value, and as a result, since the error of the sampling value with respect to the reference value is larger than $|\beta|$ and at most $|\alpha|$, the control signal k is output from the second comparator circuit 18 at a timing having an offset of x with respect to the take-in timing point A.

In such a case, the subsequent processing is carried out by using an M number of sampling data items (but $M > N$) in M fields determined by the content of the control signals j and k of the first and second comparator circuits 17 and 18 latched at the timing of the start control pulse e in the same manner as described above.

Further, the output signals j and k of the first and second comparator circuits 17 and 18 are reset at the timing having an offset y (but $x > y$) with respect to the start control pulse e.

In the example shown in FIG. 8, since the output signals j and k of the first and second comparator circuits 17 and 18 are still "0" in the processing period in the M fields, the operation is performed again in the N fields ($M > N$) in the following processing.

Figure 9:
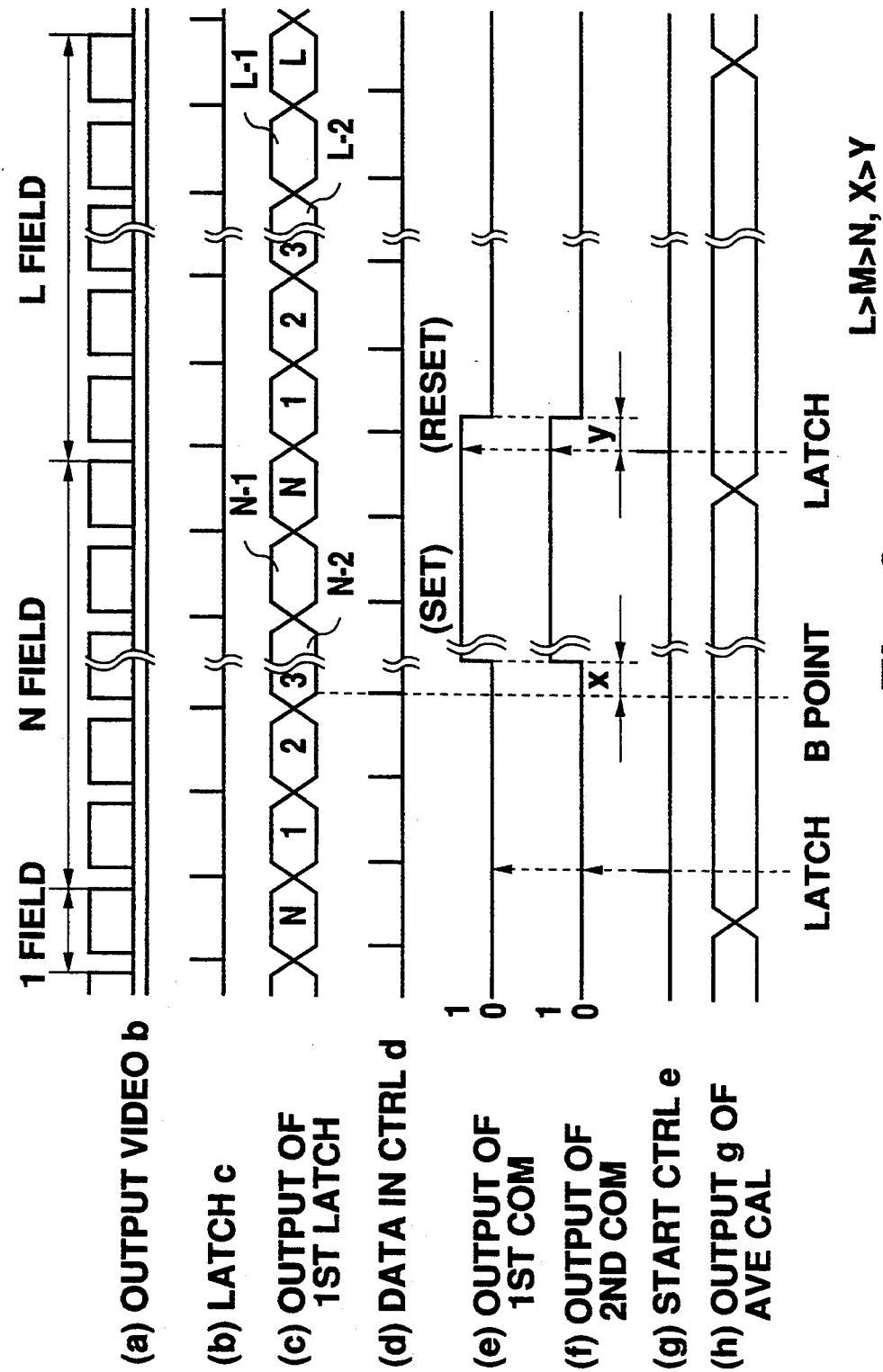
FIG. 9 is a timing chart illustrating a moving process to a calculation for obtaining an average value of data between N fields and L fields in the circuit shown in FIG. 6.

In still another example shown in FIG. 9, during the process that carries out the comparison operation between the N number of sampling data in N fields and the reference value by using the first and second comparator circuits 17 and 18, the third sampling value is taken in at the timing of a point B and is compared with the reference value, and as a result, since the error of the sampling value compared with the reference value is larger than $|\alpha|$, the control signals j and k are output from the first and second comparator circuits 17 and 18 at a timing having an offset of x with respect to the take-in timing point B.

In this case, the subsequent processing is carried out by using an L number of sampling data items (but L>M>N) in L fields determined by the content of the control signals j and k of the first and second comparator circuits 17 and 18 latched at the timing of the start control pulse e in the same manner as described above.

Further, the output signals j and k of the first and second comparator circuits 17 and 18 are reset at the timing having an offset y (but x>y) with respect to the start control pulse e.

In the example shown in FIG. 9, since the output signals j and k of the first and second comparator circuits 17 and 18 are still "0" in the processing period in the L fields, the operation is performed again in the N fields (L>M>N) in the following processing.

By processing as described above, the number of data items to be processed by the average value calculator circuit 10 is controlled by the error value of the data output from the first latch circuit 9 with respect to the reference value. That is, when there is sampling data having a large error compared with the reference value, by increasing the number of the samples to be used for the average value calculation, sufficient smoothing effects can be obtained.

Further, on the contrary, when the error of the data with respect to the reference value is small, the number of the samples to be used for the average value calculation is reduced within a range in which the smoothing effects can be obtained, and hence the response to the clamp voltage change due to the drift or the like can be carried out in a short time.

In this embodiment, the converging process of the clamp value by the ROM 11 is performed in the same manner as described above in connection with FIG. 5.

Further, the average value calculator circuit 10, the first and second comparator circuits 17 and 18 and the second control pulse generator circuit 16 can be readily realized by using a microcomputer or the like.

Figure 10:
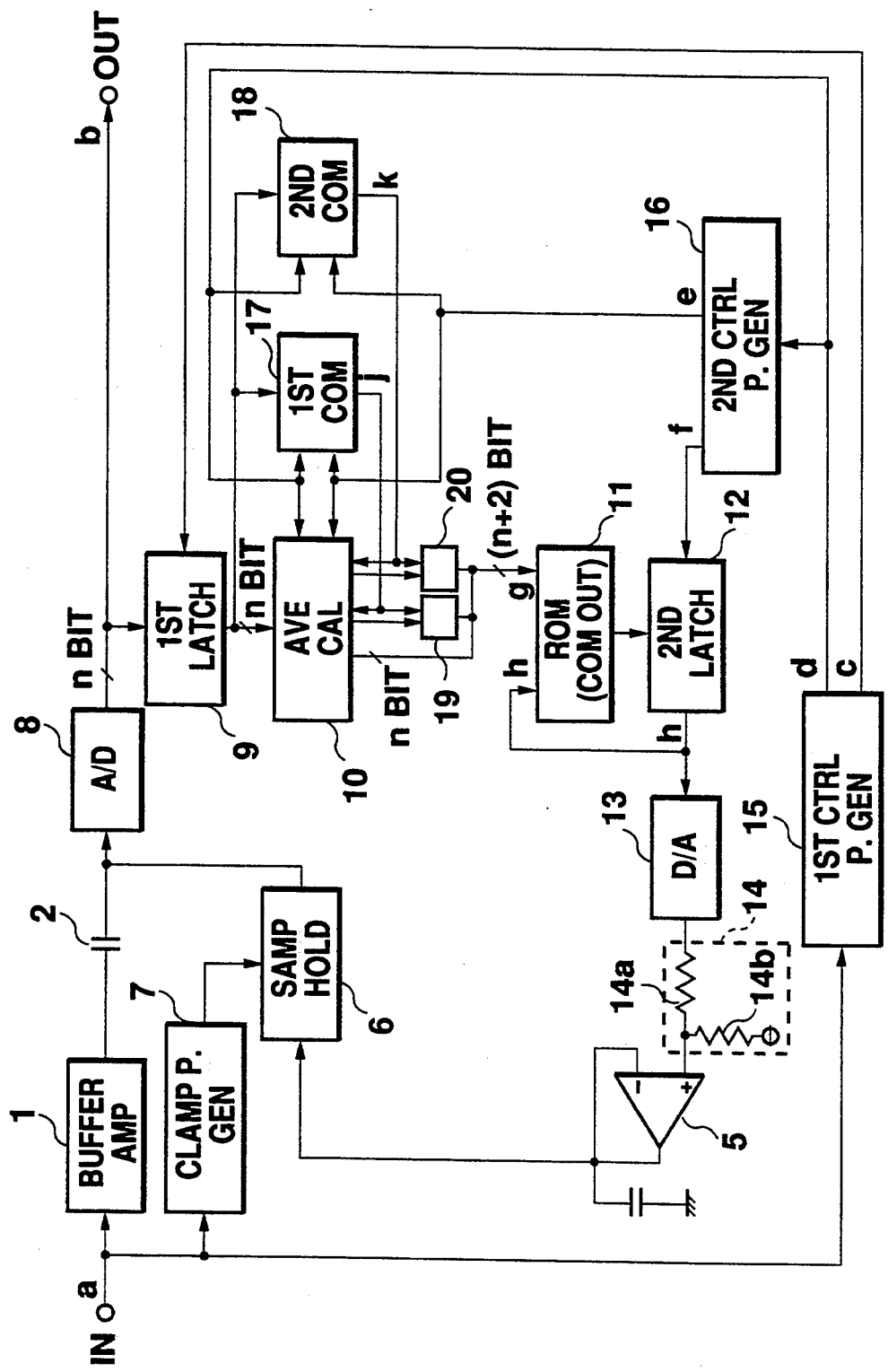
FIG. 10 is a block diagram of a third embodiment of a video signal clamping circuit according to the present invention.

In FIG. 10, there is shown the third embodiment of the video signal clamping circuit according to the present invention, having the same construction as the second embodiment shown in FIG. 6, except first and second mask processor circuits 19 and 20 are further included.

In this embodiment, the first mask processor circuit 19 controls the data of the first decimal place of the average value output from the average value calculator circuit 10 by the control signal j output from the first comparator circuit 17, and the second mask processor circuit 20 controls the data of the second decimal place of the average value output from the average value calculator circuit 10 by the control signal k output from the second comparator circuit 18, as hereinafter described in detail. Each of the first and second mask processor circuits 19 and 20 can be composed of a gate which allows the signal output from the average value calculator circuit 10 to pass when the control signal j or k of the first or second comparator circuit 17 or 18 is "0".

The ROM 11 compares (n+2) bits of average value data with the reference value. The average value data are composed of n bits of data for the integer part of the average value output from the average value calculator circuit 10 and 2 bits of data for the first and second decimal places of the average value which are controlled by the first and second mask processor circuits 19 and 20. The ROM 11 then outputs a signal added or subtracted by a predetermined width to or from the output signal of a certain previous period depending on a difference obtained by the comparison in the ROM 11.

The first control pulse generator circuit 15 not only outputs the latch pulse c to the first latch circuit 9 at the proper timing but also outputs the data in control pulse d to the average value calculator circuit 10, the second control pulse generator circuit 16 and the first and second comparator circuits 17 and 18 at the proper timing in the same manner as described above.

The second control pulse generator circuit 16 not only outputs the start control pulse e to the average value calculator circuit 10 and the first and second comparator circuits 17 and 18 at the proper timing but also outputs the latch pulse f to the second latch circuit 12 at the proper timing in the same manner as described above.

Next, the operation of the video signal clamping circuit described above in connection with FIG. 10 will be described in detail, but the same portions as those described above in the first and second embodiments can be omitted for brevity.

On the basis of the start control pulse e (FIG. 4 (e)) output from the second control pulse generator circuit 16, the average value calculator circuit 10 takes in the sampling data of the pedestal part in a plurality of fields, for example, the N fields in case of FIG. 4 at the timing of the data in control pulse d (FIG. 4 (d)) and performs the average value calculation of the N number of sampled data items to output the (n+2) bits of data composed of n bits of the integer part, which is the average value added to a predetermined offset value controlled by the output signals j and k of the first and second comparator circuits 17 and 18, and 2 bits of the decimal part.

On the other hand, the first and second comparator circuits 17 and 18 start to carry out the comparison operations on the basis of the start control pulse e output from the second control pulse generator circuit 16.

That is, the first comparator circuit 17 compares the output of the first latch circuit 9 with the reference value $\pm\alpha$ through the N fields. For example, when the output values of the first latch circuit 9 for the N number of data items are all between the reference value $+\alpha$ and the reference value $-\alpha$, the control signal j to be input to the first mask processor circuit 19 is not changed as it is "0", and the data of the first decimal place, which are input to the first mask processor circuit 19, of the (n+2) bits of the average value data output from the average value calculator circuit 10 are output to the ROM 11 through the first mask processor circuit 19 as they are.

In turn, when at least one of the output values of the first latch circuit 9 is not between the reference value $+\alpha$ and the reference value $-\alpha$, the control signal j is changed to "1", and the data of the first decimal place of the (n+2) bits of the average value data output from the average value calculator circuit 10 are masked by the first mask processor circuit 19.

Similarly, the second comparator circuit 18 compares the output of the first latch circuit 9 with the reference value $\pm\beta$ (but $\alpha>\beta$) through the N fields. For example, when the output values of the first latch circuit 9 the N number of data items are all between the reference value $+\beta$ and the reference value $-\beta$, the control signal k to be fed to the second mask processor circuit 20 is not changed as it is "0", and the data of the second decimal place, which are input to the second mask processor circuit 20, of the (n+2) bits of the average value data output from the average value calculator circuit 10 are output to the ROM 11 through the second mask processor circuit 20 as they are.

In turn, when at least one of the output values of the first latch circuit 9 is not between the reference value $+\beta$ and the reference value $-\beta$, the control signal k is changed to "1", and the data of the second decimal place of the (n+2) bits of the average value data output from the average value calculator circuit 10 are masked by the second mask processor circuit 20.

By processing as described above, the 2 bits of data of the first and second decimal places of the (n+2) bits of the average value data output from the average value calculator circuit 10 can be controlled by the first and second mask processor circuits 19 and 20 according to the error value of the data output from the first latch circuit 9 compared with the reference value.

That is, in this embodiment, since the effective digit number of the average value data can be controlled by the error value of the sampling data output from the first latch circuit 9 with reference to the reference value, in the ROM 11, when the error difference between the N number of sampling data in the N fields and the reference value is at most $|\beta|$, the (n+2) bits of average value is compared with the reference value, when the error difference is larger than $|\beta|$ and at most $|\alpha|$, the (n+1) bits of average value is compared with the reference value, and when the error difference is larger than $|\alpha|$, the n bits of average value is compared with the reference value.

In this embodiment, the reason for controlling the effective digit number of the average value calculation result is that, when the amplitude of the noise component contained in the input video signal is large, the effect of the smoothing by the average value calculation becomes insufficient, and in spite of the predetermined DC level of the input video signal, there is a possibility of the occurence of a phenomenon whereby the average value calculation result is different from the reference value, and in order to prevent this phenomenon, the comparison accuracy between the average value and the reference value can be made variable.

Figure 11:
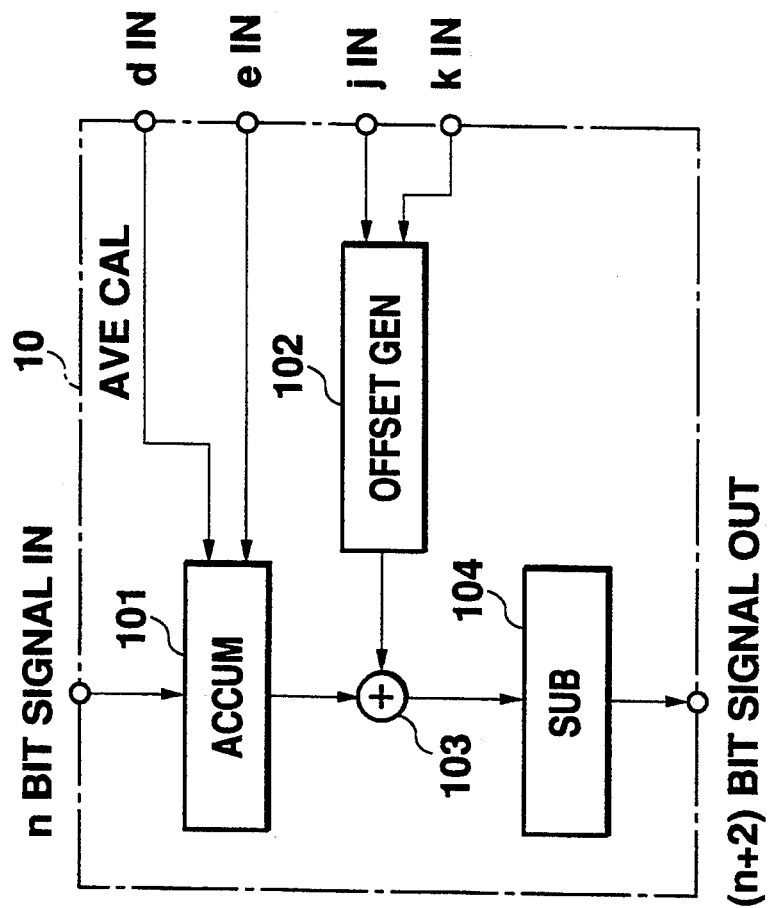
FIG. 11 is a block diagram of one example of an average value calculation circuit in the video signal clamping circuit according to the present invention.

In FIG. 11, there is shown one example of an average value calculator circuit 10 used for the embodiments of the video signal clamping circuit according to the present invention.

In this case, an accumulator 101 controls the addition processing of n bits of input signal by using the data in control pulse d and the start control pulse e sent from the external part. An offset generator 102 switches offset values by the control signals j and k of the first and second comparator circuits 17 and 18. An adder 103 receives the output of the accumulator 101 and the output of the offset generator 102 and adds the two values to output the addition result to a subtracter 104. The subtracter 104 subtracts a predetermined value from the output of the adder 103 to output (n+2) bits of signal.

For example, it is considered that a quantization bit number n of the A/D converter 8 is 8 bits, and the pedestal part of the video signal is clamped so as to be a digital value of 128.

Now, when the sample number N used for the average value calculation is 16 data, 12 bits of data near $(128\times 16)$ output from the accumulator 101 and the outputs of the adder 103 corresponding to the 12 bits of data are shown by binary numbers in FIG. 12. In this instance, the subtracter 104 removes the insignificant 2 bits, that is, divides by 4. As to the obtained 10 bits of data, the insignificant 2 bits are dealt with as the decimal data.

In FIG. 12, when relating to the output signals j and k of the first and second comparator circuits 17 and 18, j=k=0, the error difference between 16 sampling data in 16 fields and the reference value is at most $|\beta|$, and the significant (8+2)=10 bits of data output from the adder 103 is compared with the reference value (128=10000000.00).

Hence, as shown by column (d) in FIG. 12, the area discriminated as equal to the reference value is indicated by a broken line frame.

Similarly, when only the output signal k of the second comparator circuit 18 is 1, that is, j=0 and k=1, the error difference between 16 sampling value in 16 fields and the reference value is larger than $|\beta|$ and at most $|\alpha|$, and the significant (8+1)=9 bits of data output from the adder 103 is compared with the reference value (128=10000000.00).

Thus, as shown by column (c) in FIG. 12, the area discriminated as equal to the reference value is indicated by the broken line frame.

Also similarly, when the output signals j and k of the first and second comparator circuits 17 and 18 are 1, that is, j=k=1, the error difference between 16 sampling value in 16 fields and the reference value is larger than $|\alpha|$, and the significant 8 bits of data output from the adder 103 is compared with the reference value (128=10000000.00).

Thus, as shown by column (b) in FIG. 12, the area discriminated as equal to the reference value is indicated by the broken line frame.

As described above, in this embodiment, by using the error value of the sampling value with reference to the reference value, the width discriminated as converged to the reference value is made variable.

Further, the offset generator 102 outputs, as shown by the broken line frames in FIG. 12, the proper values for distributing the convergence discrimination area around the data of $(128\times 16=10000000.0000)$.

In the example shown in FIG. 12, the offset value when j=k=0, is "2", when J=0 and k=1, it is "4", and when j=k=1, it is "8".

In the third embodiment, further, the average value calculator circuit 10, the first comparator circuit 17, the second comparator circuit 18, the first mask processor circuit 19 and the second mask processor circuit 20 can be readily realized by using a microcomputer or the like.

In this embodiment, as shown in FIG. 10, the (n+2) bits of the calculation result g of the average value calculator circuit 10 controlled by the first and second mask processor circuits 19 and 20 is used as an address signal of the ROM 11. In turn, the output of the ROM 11 is input to the second latch circuit 12 and is latched by the latch pulse f therein.

The output h of the second latch circuit 12 is input to not only the D/A converter 13 but also the ROM 11. Hence, the ROM 11 compares the output g of the average value calculator circuit 10 controlled by the first and second mask processor circuits 19 and 20, i.e., the average value of the N number of sampled data items in the past N fields, including the present value, with the reference pedestal value, and, when the output g of the average value calculator circuit 10 controlled by the first and second mask processor circuits 19 and 20 is smaller than the reference pedestal value, the ROM 11 outputs a value 1 LSB larger than the output h of the second latch circuit 12, i.e., the output value of the N fields before. Similarly, when the output g of the average value calculator circuit 10 controlled by the first and second mask processor circuits 19 and 20 is larger than the reference pedestal value, the ROM 11 outputs a value 1 LSB smaller than the output h of the second latch circuit 12 in the same manner as described above.

Then, the level compression of the output of the D/A converter 13 is performed by the level compression shift circuit 14 so that the conversion width per one bit may be smaller than the resolution per one bit of the A/D converter 8, and simultaneously the level shift of the same is carried out so that the signal may swing around the converging value. The output of the level compression shift circuit 14 is supplied to the clamp voltage generator circuit 5, and the clamp voltage generator circuit 5 changes the output voltage depending on the input voltage. The output voltage of the clamp voltage generator circuit 5 is fed as the clamp voltage to the A/D converter 8 through the sample and hold circuit 6 in the same manner as the first and second embodiments described above.

In this embodiment, the converging process of the clamp value by the ROM is performed in the same manner as described above in connection with FIG. 5.

It is apparent from the above description that it is necessary to mask at least one bit in the third embodiment. In the above described second and third embodiments there are two comparators, the first comparator 17 and the second comparator 18. However at least one comparator is necessary to perform the above described operation.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A video signal clamping circuit for maintaining a DC level of a digital video signal at a fixed level, comprising:

an A/D converter for converting an input analog video signal into the digital video signal;

a first latch circuit for sampling a predetermined part of the digital video signal at a predetermined period and latching the sampled data;

an average value calculator circuit for taking in a predetermined number of the sampled data items latched by the first latch circuit and calculating an average value of the sampled data;

a comparison output circuit for comparing the average value obtained in the average value calculator circuit with a reference value and outputting data either added or subtracted by a predetermined width to or from an output signal of a predetermined period before depending on a comparison result;

a D/A converter for converting the data output by the comparison output circuit into an analog signal; and a clamp voltage supply means for supplying a clamp voltage to the input analog video signal on the basis of the analog signal output by the D/A converter, wherein the clamp voltage supply means includes a level compression shift for carrying out a level compression so that a voltage variation amount of the output of the D/A converter corresponding to 1 LSB of change of the input of the D/A converter is less than a voltage variation amount of 1 LSB change of the output of the A/D converter, and for shifting the voltage level to a predetermined level.

2. The circuit of claim 1, wherein the clamp voltage supply means further includes a buffer means for stabilizing the output of the level compression shift circuit, and a hold means for holding an output of the buffer means at a predetermined period and supplying the clamp voltage to the analog video signal input to the A/D converter.

3. The circuit of claim 1, further comprising a second latch circuit for latching the output of the comparison output circuit at a predetermined period and supplying the output to the D/A converter.

4. The circuit of claim 1, further comprising first control signal generator means for generating a first control signal for determining a sampling timing of the first latch circuit and a take-in timing of the average value calculator circuit on the basis of a vertical synchronizing signal of the input analog video signal to supply data in a pedestal period of the analog video signal to the average value calculator circuit.

5. The circuit of claim 4, further comprising second control signal generator means for generating a second control signal for determining a number of data taken from the first latch circuit into the average value calculator circuit.

6. The circuit of claim 1, further comprising variation width detector means for detecting a variation width of the output of the first latch circuit to change a number of data taken in the average value calculator circuit according to the variation width.

7. The circuit of claim 6, wherein the variation width detector means includes first and second comparators for comparing the variation width with first and second reference values, respectively, to detect the variation width from the comparison results of the two comparators.

8. The circuit of claim 1, further comprising variation width detector means for detecting a variation width of the output of the first latch circuit and mask processor means for masking predetermined decimal bits of data of the output of the average value calculator circuit, to change a number of the bits masked by the mask processor means depending on the detection result of the variation width detector means.

9. The circuit of claim 8, wherein the variation width detector means includes first and second comparators for comparing the variation width with first and second reference values, respectively, to detect the variation width from the comparison results of the two comparators.

10. The circuit of claim 9, wherein the average value calculator circuit includes an accumulator for accumulating a predetermined number of the the sampled data, an adder for adding a predetermined offset value to an output of the accumulator, and an offset value generator for generating the predetermined offset value.

11. The circuit of claim 10, the offset value generator changes the generated offset value depending on the detection result of the variation width detector means.

* * * * *